US008170544B1

(12) United States Patent
Satapathy et al.

(10) Patent No.: US 8,170,544 B1
(45) Date of Patent: May 1, 2012

(54) METHOD AND SYSTEM FOR INTEGRATED MANAGEMENT OF BASE TRANSCEIVER STATION (BTS) WITH WIRELESS BACKHAUL

(75) Inventors: Durga Prasad Satapathy, Olathe, KS (US); Bruce E Hoffman, Overland Park, KS (US); Mohammad Wasif Hussain, Overland Park, KS (US); Harold W Johnson, Roach, MO (US); Youngil Ha, McLean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1108 days.

(21) Appl. No.: 11/669,032

(22) Filed: Jan. 30, 2007

Related U.S. Application Data

(63) Continuation-in-part of application No. 11/492,468, filed on Jul. 25, 2006.

(51) Int. Cl.
*H04W 24/00* (2009.01)

(52) U.S. Cl. ......... 455/423; 455/424; 455/560; 455/453

(58) Field of Classification Search .................. 455/423, 455/455, 425, 67.11, 424, 422.11, 403, 557, 455/556, 631, 532, 560, 67.13, 501, 67.14, 455/453
See application file for complete search history.

(56) References Cited

U.S. PATENT DOCUMENTS

| | | | |
|---|---|---|---|
| 6,188,912 B1 | 2/2001 | Struhsaker et al. | |
| 6,208,627 B1 * | 3/2001 | Menon et al. | 370/328 |
| 6,311,066 B1 | 10/2001 | Neumiller et al. | |
| 6,341,222 B1 | 1/2002 | Neumiller et al. | |
| 6,353,742 B1 | 3/2002 | Bach | |
| 6,481,005 B1 | 11/2002 | Crowley et al. | |
| 6,577,863 B2 | 6/2003 | Bourlas et al. | |
| 6,580,924 B1 | 6/2003 | Lu et al. | |
| 6,640,108 B2 | 10/2003 | Lu et al. | |
| 6,654,616 B1 | 11/2003 | Pope, Jr. et al. | |
| 6,732,153 B1 | 5/2004 | Jakobson et al. | |
| 6,748,212 B2 | 6/2004 | Schmutz et al. | |
| 6,766,368 B1 | 7/2004 | Jakobson et al. | |
| 6,832,085 B1 * | 12/2004 | McDonagh et al. | 455/423 |
| 6,941,557 B1 | 9/2005 | Jakobson et al. | |
| 7,003,322 B2 | 2/2006 | Judd | |

(Continued)

OTHER PUBLICATIONS

Metro Ethernet Forum, "Introduction to Circuit Emulation Services over Ethernet," 2004.

(Continued)

*Primary Examiner* — Jinsong Hu
*Assistant Examiner* — Dung Hong

(57) ABSTRACT

A base transceiver station (BTS) includes a radio access network (RAN) interface for communicating with mobile stations and a backhaul interface for communicating with a backhaul network. A RAN element management system generates RAN status information based on event notifications from the RAN interface. A backhaul element management system generates backhaul status information based on event notifications from the backhaul interface. A correlation engine generates correlated status information for the BTS based on the RAN status information and the backhaul status information. The correlated status information indicates performance of the RAN interface in combination with the backhaul interface. The correlated status information is monitored at a network management system (NMS). The NMS may be used to take corrective actions to address problems identified in the correlated status information.

19 Claims, 5 Drawing Sheets

U.S. PATENT DOCUMENTS

| | | | |
|---|---|---|---|
| 7,039,041 | B2 | 5/2006 | Robohm et al. |
| 7,043,270 | B2 | 5/2006 | Judd et al. |
| 7,092,363 | B1 | 8/2006 | Majidi-Ahy |
| 2002/0167967 | A1 | 11/2002 | Jammes et al. |
| 2003/0002458 | A1 | 1/2003 | Bernheim |
| 2003/0064720 | A1* | 4/2003 | Valins et al. .................. 455/423 |
| 2003/0069959 | A1* | 4/2003 | Tse .............................. 709/224 |
| 2004/0062214 | A1* | 4/2004 | Schnack et al. ............... 370/315 |
| 2004/0156313 | A1 | 8/2004 | Hofmeister et al. |
| 2004/0179555 | A1 | 9/2004 | Smith |
| 2004/0218586 | A1 | 11/2004 | Khoury et al. |
| 2004/0253984 | A1 | 12/2004 | Csapo et al. |
| 2005/0007993 | A1* | 1/2005 | Chambers et al. ............ 370/349 |
| 2005/0064820 | A1* | 3/2005 | Park et al. .................. 455/67.11 |
| 2005/0107087 | A1* | 5/2005 | Makinen et al. ............. 455/450 |
| 2005/0159165 | A1 | 7/2005 | Argyropoulos et al. |
| 2005/0160180 | A1 | 7/2005 | Rabje et al. |
| 2005/0201289 | A1 | 9/2005 | Smolinske et al. |
| 2006/0056426 | A1* | 3/2006 | Wakameda et al. ........... 370/401 |
| 2006/0083186 | A1 | 4/2006 | Handforth et al. |
| 2006/0083205 | A1 | 4/2006 | Buddhikot et al. |
| 2006/0084429 | A1 | 4/2006 | Buvaneswari et al. |
| 2006/0111047 | A1 | 5/2006 | Louberg et al. |
| 2006/0133404 | A1 | 6/2006 | Zuniga et al. |
| 2006/0153233 | A1 | 7/2006 | Chen et al. |
| 2006/0227767 | A1 | 10/2006 | Johnson et al. |
| 2006/0246952 | A1 | 11/2006 | Widmayer et al. |
| 2007/0155375 | A1* | 7/2007 | Kappel et al. .............. 455/422.1 |

OTHER PUBLICATIONS

Axerra Networks, "2G BTS Backhaul over Ethernet or IP," Application Note, 2004.

Axerra Networks, "Circuit Emulation Pseudo-Wire (CE-PW)," White Paper, 2005.

Axerra Networks, "AXNVISION Network and Element Management System," Product Overview, 2006.

Steve Byars, "Using Pseudo-Wires for; Mobile Wireless Backhaul over Carrier Ethernet," Converge! Network Digest, Feb. 13, 2006.

X. Xiao et al., "Requirements for Pseudo-Wire Emulation Edge-to-Edge (PWE3)," Request for Comments 3916, Sep. 2004.

S. Bryant et al., "Pseudo Wire Emulation Edge-to-Edge (PWE3) Architecture," Request for Comments 3985, Mar. 2005.

M. Riegel, "Requirements for Edge-to-Edge Emulation of Time Division Multiplexed (TDM) Circuits over Packet Switching Networks," Request for Comments 4197, Oct. 2005.

International Engineering Consortium, "Element Management Systems (EMSs)," Web ProForum Tutorials, 2002.

Verizon Information Technologies LLC, "UMS®: Usage Management System," 2005.

Office Action, dated Sep. 29, 2009, from related U.S. Appl. No. 11/492,468.

"Monitoring and Control of an Ethernet Link Using Pseudo-Wire Interfaces," U.S. Appl. No. 11/146,594, filed Jun. 7, 2005.

\* cited by examiner

METHOD AND SYSTEM FOR INTEGRATED MANAGEMENT OF BASE TRANSCEIVER STATION (BTS) WITH WIRELESS BACKHAUL

CROSS-REFERENCE TO RELATED APPLICATION

This application is a continuation-in-part of U.S. patent application Ser. No. 11/492,468, filed Jul. 25, 2006, which is incorporated herein by reference.

BACKGROUND

1. Field of the Invention

The present invention relates to telecommunications and, more particularly, to methods and systems for managing the various interfaces of a base transceiver station (BTS) in an integrated fashion.

2. Description of Related Art

A wireless service provider typically provides wireless coverage in a given area, such as a city, county, or metropolitan area or along a highway, by placing multiple base transceiver stations (BTSs) at selected locations so as to provide good wireless coverage within the given area. Each BTS may be able to wirelessly communicate with mobile stations that are operating in a "cell" surrounding the BTS. The wireless coverage area of the cell may be further divided into multiple sectors that are provided by directional antennas at the BTS.

The traffic to and from multiple BTSs may be aggregated at a central location in the wireless service provider's network, such as at a base station controller (BSC) or radio network controller (RNC). Such traffic may include bearer traffic, i.e., the voice, data, or other media that the mobile stations transmit or receive over the air interface, and may also include signaling traffic. The term "backhaul" is often used to describe the process of conveying traffic between BTSs and other elements in the wireless service provider's network (e.g., BSCs or RNCs). Currently, backhaul between BTSs and BSCs (or other network elements) is typically provided by circuit-switched connections, such as T1 or E1 lines. Such circuit-switched connections are often leased from local exchange carriers. However, such leasing can represent a significant expense for wireless service providers. Reliance on leased circuit-switched connections can also limit a wireless service provider's ability to monitor and optimize the performance of its wireless telecommunications network.

Wireless backhaul communication links have been proposed as an alternative to using circuit-switched connections for backhaul. Although this approach can provide benefits, the wireless service provider might as a result operate two different wireless networks: a radio access network (RAN) that is used to communicate with mobile stations and a wireless backhaul network that provides backhaul for the RAN. Two different wireless networks may, in turn, lead to two different sets of operational systems support (OSS) elements. For example, one type of element management system may be used to manage RAN elements, and another type of element management system may be used to manage the backhaul network elements. The presence of two different element management systems may make it more difficult for the wireless service provider to monitor the overall performance of the wireless telecommunications network and to react appropriately to any problems that may be identified.

Accordingly, there is a need for methods and systems for managing network elements more efficiently.

SUMMARY

In a first principal aspect, an exemplary embodiment of the present invention provides a system for managing elements of a wireless telecommunications network. The system comprises a radio access network (RAN) element for wireless communication with mobile stations, a backhaul element for conveying backhaul for the RAN element, a RAN element management system (EMS) for remotely managing the RAN element, a backhaul EMS for remotely managing the backhaul element, and a correlation engine. The RAN element is configured to generate RAN event notifications, and the RAN EMS is configured to generate RAN status information based on the RAN event notifications. The backhaul element is configured to generate backhaul event notifications, and the backhaul EMS is configured to generate backhaul status information based on the backhaul event notifications. The correlation engine is configured to generate correlated status information based on the RAN status information and the backhaul status information, whereby the correlated status information indicates performance of the RAN element in combination with the backhaul element.

In a second principal aspect, an exemplary embodiment of the present invention provides a system for a wireless telecommunications network. The system comprises a base transceiver station (BTS) and a network management system (NMS). The BTS includes a radio access network (RAN) interface for communicating with mobile stations and a backhaul interface for communicating with a backhaul network. The NMS is configured to monitor correlated status information of the BTS, the correlated status information indicating performance of the RAN interface in combination with the backhaul interface.

In a third principal aspect, an exemplary embodiment of the present invention provides a method for monitoring a base transceiver station (BTS) of a wireless telecommunications network. The BTS includes a radio access network (RAN) interface for communicating with mobile stations and a backhaul interface for communicating with a backhaul network. In accordance with the method, RAN event notifications are received from the RAN interface, and backhaul event notifications are received from the backhaul interface. RAN status information is generated based on the RAN event notifications, and backhaul status information is generated based on the backhaul event notifications. Correlated status information is generated based on the RAN status information and the backhaul status information, whereby the correlated status information indicates performance of the RAN interface in combination with the backhaul interface. The correlated status information is provided to a network management system. The correlated status information is monitored at the network management system.

DETAILED DESCRIPTION OF EXEMPLARY EMBODIMENTS

1. Overview

Figure 1:
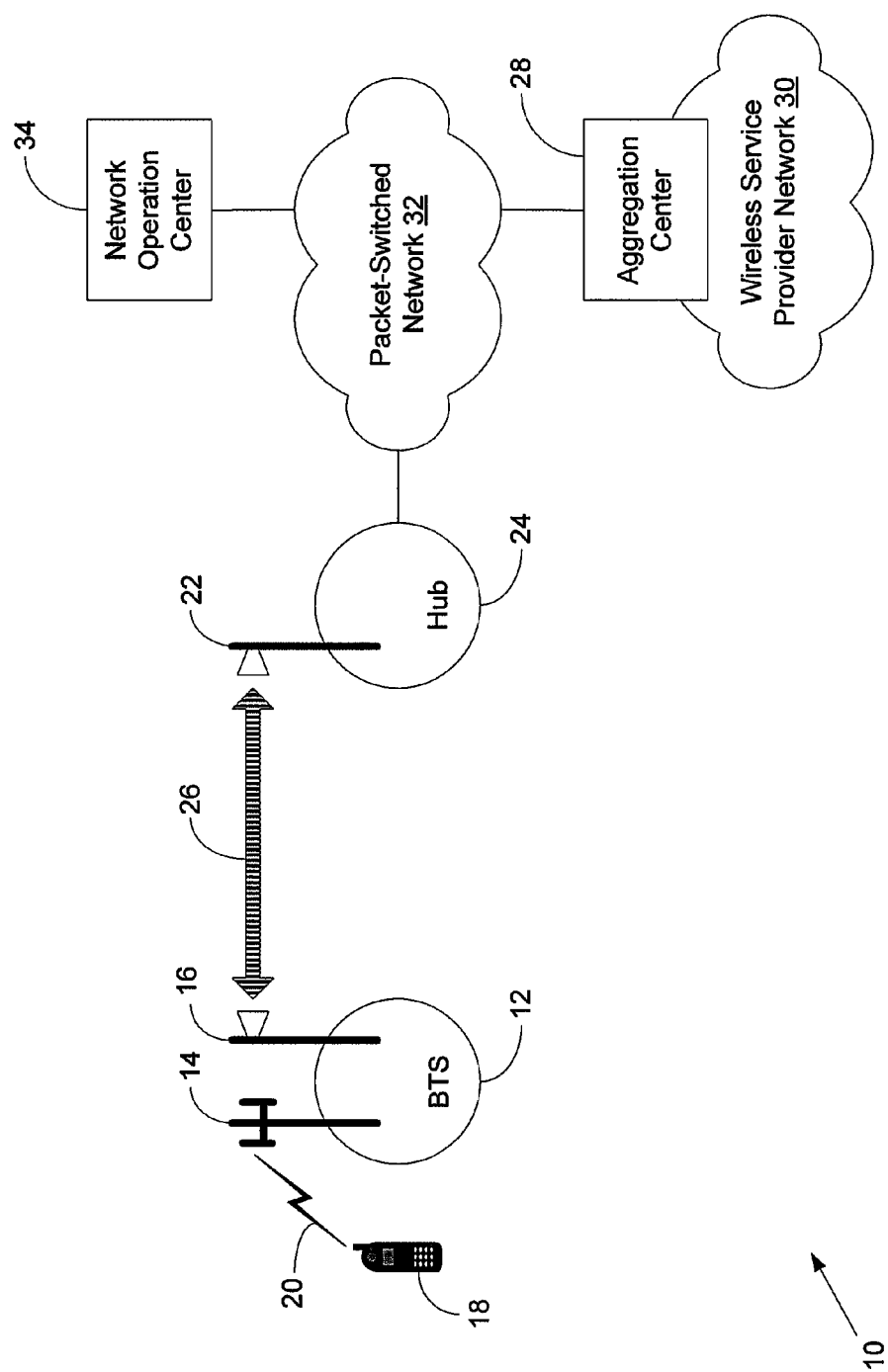
FIG. 1 is a block diagram of a wireless telecommunications network, in accordance with an exemplary embodiment of the present invention.

The present invention, in its exemplary embodiments, addresses the limitations of relying on leased circuit-switched connections for backhaul by providing a base transceiver station (BTS) that uses a wireless communication link for backhaul. The BTS may be configurable to use any of a plurality of different types of wireless communication links for backhaul, e.g., to use any of a preselected set of wireless backhaul options. The different types of wireless communication links may use different frequencies, different modes of wireless distribution (e.g., point-to-point, point-to-multipoint, or mesh) and/or different wireless duplexing modes (e.g., frequency division duplexing or time division duplexing). In addition, an integrated network management architecture may by provided to manage the various interfaces of the BTS, such as radio access network (RAN) and wireless backhaul interfaces in a logically integrated fashion.

A configurable BTS may have a modular design in which a particular wireless backhaul module configures the BTS to use a particular type of wireless link for backhaul. For example, the BTS may include a chassis that can accommodate any of a plurality of different types of wireless backhaul module, so as to provide a menu of wireless backhaul options for the BTS.

Thus, a BTS might be configured to use a first type of wireless backhaul link by mounting a first wireless backhaul module in the chassis. Subsequently, the BTS may be re-configured for a second type of wireless backhaul link by removing the first wireless backhaul module from the chassis and replacing it with a second wireless backhaul module. The chassis may also accommodate other types of modules, such as a RAN module for communicating with mobile stations and an emulation module for emulating a circuit-switched backhaul connection for the RAN modules.

In an exemplary embodiment, a two-tiered backhaul network may be used between base transceiver stations (BTSs) and an aggregation center in the wireless service provider's network. The aggregation center may be a location in the wireless service provider's network where traffic from or to multiple BTSs is aggregated. The aggregation center may include, for example, a base station controller (BSC), a mobile switching center (MSC), and/or other network elements.

In the first tier of the backhaul network, BTSs communicate with a hub station via wireless links. In the second tier, the hub station communicates with the aggregation center via a packet-switched network. Pseudo-wire emulation (PWE) devices may be used to emulate a circuit-switched connection through the packet-switched network. Relevant aspects of pseudo-wire emulation are described in the following documents, which are incorporated herein by reference: Xiao, "Requirements for Pseudo-Wire Emulation Edge-to-Edge (PWE3)," Request for Comments 3916 (September 2004); Bryant, "Pseudo Wire Emulation Edge-to-Edge (PWE3) Architecture," Request for Comments 3985 (March 2005); and M. Riegel, "Requirements for Edge-to-Edge Emulation of Time Division Multiplexed (TDM) Circuits over Packet Switching Networks," Request for Comments 4197 (October 2005).

In accordance with the pseudo-wire approach, a PWE device may be included in each BTS (e.g., as an emulation module in the chassis) and in the aggregation center. The PWE devices may also function as part of the wireless service provider's operational support system (OSS), for example, to facilitate monitoring of performance factors such as packet loss, packet delay, bit error rates, and jitter.

In this way, backhaul may be provided without reliance on leased circuit-switched connections. Moreover, by using configurable BTSs, a wireless service provider may beneficially use the types of wireless backhaul that are most convenient for a given network arrangement at a given time. When it becomes desirable to use a different type of wireless backhaul for one or more of the BTSs, e.g., as a result of additional BTSs, hub stations, or service upgrades, the wireless service provider may re-configure the affected BTSs by replacing their wireless backhaul modules with new wireless backhaul modules.

The use of wireless communication links and packet-switched networks for backhaul may also be facilitated by an integrated approach to managing BTSs. In particular, a RAN element management system (EMS) may manage the RAN interfaces of the BTSs, and a backhaul EMS may manage the backhaul interfaces of the BTSs. The RAN EMS and backhaul EMS could be, for example, from different vendors with different proprietary interfaces. Moreover, the RAN EMS and backhaul EMS may generate status information in different formats.

In order to provide a unified view of the performance of the BTSs, correlation techniques may be applied to the status information generated by the RAN EMS and backhaul EMS. For example, a correlation engine may generate correlated status information based on (i) the RAN status information generated by the RAN EMS and (ii) the backhaul status information generated by the backhaul EMS. In this way, the correlated status information for a BTS indicates performance of the RAN interface(s) in combination with the backhaul interface(s), so as to present a unified view of the operation of the BTS.

The correlated status information may then be provided to one or more higher-level systems, e.g., via a "northbound" interface. The higher-level systems may include one or more network management systems, i.e., systems that operate at the network management layer of the Telecommunications Management Network (TMN) layered model. Such network management systems may be involved in, for example, fault, performance, and/or service quality management.

In an exemplary approach, the RAN EMS and backhaul EMS exchange status information via a peering interface. One of the EMSs (either the RAN EMS or the backhaul EMS) may then apply correlation techniques to generate correlated status information and provide the correlated status information to one or more higher-level systems. Thus, one of the EMSs may include the correlation engine and may interface with the one or more higher-level systems on behalf of both EMSs. Alternatively, the correlation engine could be separate from the EMSs. For example, the correlation engine might receive RAN status information from the RAN EMS and, separately, receive backhaul status information from the backhaul EMS. The correlation engine may then generate correlated status information based on the RAN and backhaul status information and provide the correlated status information to one or more higher-level systems.

The correlated status information may be used to identify the causes of service issues occurring at a BTS, whether the service issues originate on a RAN interface of the BTS, a backhaul interface of the BTS, or due to interaction between the RAN and backhaul interfaces. Once a service issue has been identified, corrective action may be taken, either automatically or by operations personnel. Corrective action could involve, for example, adjustment of RAN and/or backhaul traffic parameters. As one example, a fault in the backhaul network may trigger throttling or load balancing responses in the RAN. As another example, an increase in usage of the RAN may be addressed by increasing capacity in the backhaul network.

2. Exemplary Wireless Telecommunications Architecture

FIG. 1 shows a wireless telecommunications network 10 that uses an exemplary two-tier backhaul network. As shown in FIG. 1, network 10 includes a BTS 12 that has a radio access network (RAN) antenna 14 and a backhaul antenna 16. BTS 12 uses RAN antenna 14 for communication with mobile stations, such as mobile station 18, via an air interface 20. Mobile station 18 could be, for example, a wireless telephone, wireless personal digital assistant (PDA), wirelessly-equipped laptop computer, or other wireless communication device. The communications over air interface 20 may use a protocol such as 1xRTT, EV-DO, iDEN, IEEE 802.16d (WiMAX), UMTS, or TD-CDMA. However, other air interface protocols could be used.

BTS 12 uses backhaul antenna 16 for wireless backhaul. For example, BTS 12 may use backhaul antenna 16 to communicate with a corresponding backhaul antenna 22 at a hub station 24, via a wireless backhaul link 26. Hub station 24 might also function as a BTS, communicating with mobile stations via an air interface. Although FIG. 1 shows only one BTS in wireless communication with hub station 24, it is to be understood that hub 24 may wirelessly communicate with multiple BTSs for backhaul.

Hub station 24 may communicate with BTS 12 and/or other BTSs using a wireless distribution mode such as point-to-point (PTP), point-to-multipoint (PTM), or microwave mesh. Thus, wireless backhaul link 26 could be a PTP link between hub station 24 and BTS 12. Alternatively, wireless backhaul link 26 could be part of a PTM or mesh arrangement for wireless backhaul between hub station 24 and multiple BTSs. In the case of a mesh arrangement, BTS 12 may communicate with one or more other BTSs instead of or in addition to hub station 24. Thus, in a mesh arrangement, backhaul communications may be conveyed between BTS 12 and hub station 24 via one or more intermediate BTSs.

In an exemplary embodiment, wireless backhaul link 26 uses frequencies in the microwave spectrum. For example, wireless backhaul link 26 might use frequencies in the Broad Radio Service (BRS) bands (2.5 GHz), Advanced Wireless Service (AWS) bands (1.7, 2.1 GHz), Wireless Communication Service (WCS) bands (2.3 GHz), Local Multipoint Distribution Service (LMDS) bands (28, 39 GHz), Digital Electronic Messaging Service (DEMS) bands (24 GHz), Common Carrier PTP bands (2, 4, 6, 10, 11, 18, 24 GHz), Unlicensed National Information Infrastructure (UNII) bands (5 GHz), or E-Band (71-76, 81-86, 92-95 GHz). It is to be understood that these frequency bands are exemplary only. Other frequency bands could be used, depending on availability and applicable regulations.

Wireless backhaul link 26 may also use different duplexing modes. For example, wireless backhaul link 26 might use frequency division duplexing (FDD) or time division duplexing (TDD).

The wireless communications between hub station 24 and BTS 12 (and other BTSs) may be described as the "first tier" of the backhaul network. In the "second tier," hub station 24 may communicate with an aggregation center 28 in wireless service provider network 30, via a packet-switched network 32. Packet-switched network 32 may be any local area network (LAN), metropolitan area network (MAN), or wide area network (WAN) that carries data in the form of packets. The physical layer of packet-switched network 32 could be provided by one or more fiber optic (e.g., SONET) and/or wireless networks. Packets may be conveyed through packet-switched network 32 using a protocol, such as Ethernet (IEEE 802.3), that operates over the physical layer. A protocol such as the Internet Protocol (IP) or MultiProtocol Label Switching (MPLS) may be used for addressing packets that are conveyed through packet-switched network 32. Packet-switched network 32 may also use other protocols for communication.

In some cases, packet-switched network 32 may be operated by the wireless service provider. Alternatively, packet-switched network 32 could be operated by an entity other than the wireless service provider. Thus, packet-switched network 32 could be a commercial Ethernet network.

Although FIG. 1 shows only one hub station, it is to be understood that backhaul communications to and from multiple hub stations could be aggregated at aggregation center 28. Also, packet-switched network 32 may convey backhaul communications for more than one aggregation center. In addition to hub stations and aggregation centers, packet-switched network 32 may communicate with other types of network elements. For example, packet-switched network 32 may communicate with a network operation center (NOC) 34. NOC 34 may be used to monitor and control communications through packet-switched network 32, for example, for OSS purposes.

Figure 2:
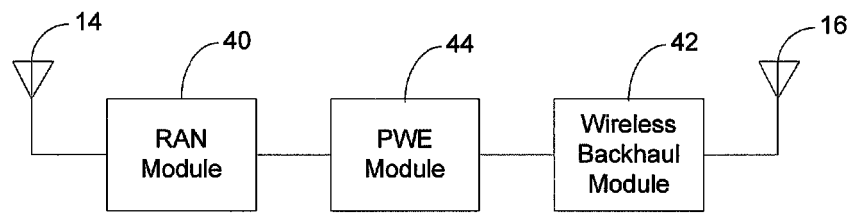
FIG. 2 is a block diagram of a configurable base transceiver station (BTS), in accordance with an exemplary embodiment of the present invention.

In an exemplary embodiment, BTS 12 is configurable in that the type of wireless backhaul link 26 (e.g., with respect to frequency, distribution mode, and/or duplexing) can be selected from a menu of options. An example of a configurable BTS 12 is illustrated in FIG. 2. Configurable BTS 12 may include a radio access network (RAN) module 40 that is communicatively coupled to RAN antenna 14 and a wireless backhaul module 42 that is communicatively coupled to backhaul antenna 16. RAN module 40 may include a transceiver and/or other components to support wireless communications with mobile stations via RAN antenna 14. Wireless backhaul module 42 may include a transceiver and/or other components to support wireless backhaul communications via backhaul antenna 16.

Configurable BTS 12 may also include a pseudo-wire emulation (PWE) module 44 that conveys backhaul communications between RAN module 40 and wireless backhaul module 42. More particularly, PWE module 44 may emulate a circuit-switched connection, such as a T1 or E1 line, for RAN module 40. In this way, even though RAN module 40 may be designed for a conventional circuit-switched backhaul connection, PWE module 44 may enable packet-switched network 32 to be used for backhaul instead.

The use of modules may enable BTS 12 to be easily configurable. For example, BTS 12 may be configured to use a different type of wireless backhaul link by replacing wireless backhaul module 42 with a different wireless backhaul module. In addition, RAN modules may be replaced in or added to BTS 12, e.g., to enable BTS 12 to communicate with mobile stations using different frequencies and/or air interface formats.

Although FIG. 2 shows only one RAN nodule and one wireless backhaul module, it is to be understood that configurable BTS 12 may include multiple RAN modules (e.g., for different sectors, frequencies, and/or air interface formats) and/or multiple wireless backhaul modules. BTS 12 may also include other components. For example, if a mesh arrangement is used for wireless backhaul, then BTS 12 may also include an Ethernet switch in order to switch between backhaul traffic originating or destined for BTS 12 and backhaul traffic that BTS 12 conveys for other BTSs.

Figure 3:
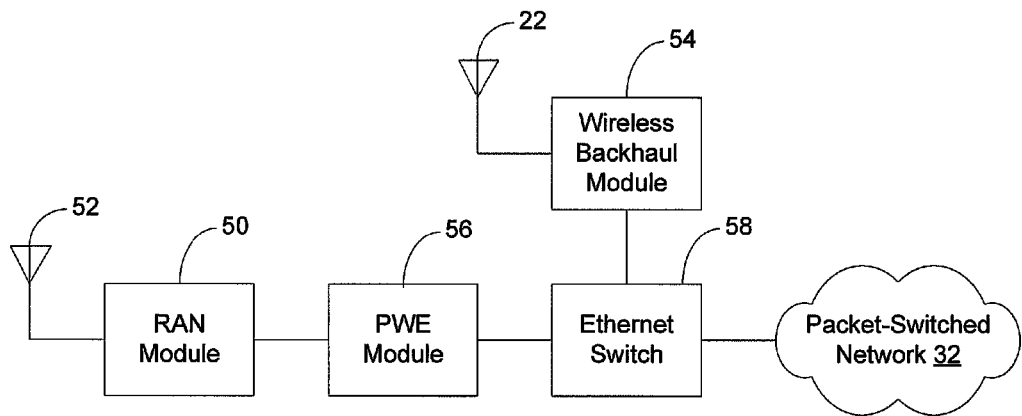
FIG. 3 is a block diagram of a configurable hub station, in accordance with an exemplary embodiment of the present invention.

Hub station 24 may also be configurable. FIG. 3 illustrates an example of a configurable hub station 24 that also functions as a BTS. In the example of FIG. 3, hub station 24 includes a RAN module 50 communicatively coupled to a RAN antenna 52 and a wireless backhaul module 54 communicatively coupled to backhaul antenna 22. RAN module 50 may include a transceiver and/or other components to support wireless communications with mobile stations via RAN antenna 52. Wireless backhaul module 54 may include a transceiver and/or other components to support wireless backhaul communications via backhaul antenna 22.

Hub station 24 may also include a PWE module 56 that emulates a circuit-switched connection, such as a T1 or E1 line, for RAN module 50. In addition, hub station 24 may include an Ethernet switch 58 communicatively coupled to wireless backhaul module 54, PWE module 56, and packet-switched network 32. Ethernet switch 58 may switch between backhaul traffic that originates from or is destined for RAN module 50 and backhaul traffic conveyed via wireless backhaul module 54.

Although FIG. 3 shows only one RAN module and one wireless backhaul module in hub station 24, it is to be understood that hub station 24 may include multiple RAN modules and/or multiple wireless backhaul modules. For example, huh station 24 may include multiple wireless backhaul modules to provide multiple wireless backhaul links with BTSs.

Figure 4:
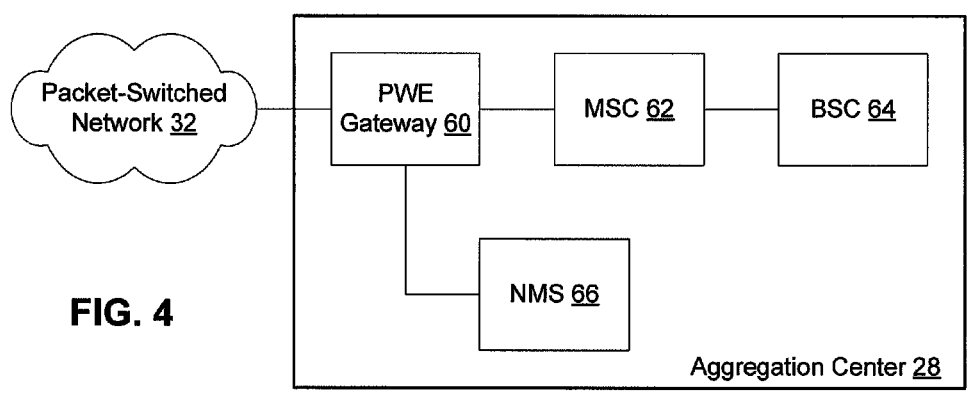
FIG. 4 is a block diagram of an aggregation center, in accordance with an exemplary embodiment of the present invention.

In order to provide end-to-end emulation of circuit-switched connections through packet-switched network 32, PWE modules 44 and 56 may communicate with a PWE gateway 60 at the other end of packet-switched network 32. For example, PWE gateway 60 may be located in aggregation center 28, as shown in FIG. 4. PWE gateway 60 may aggregate traffic from multiple PWE devices and may convert the traffic into a circuit-switched format for communication with other network elements. For example, PWE gateway 60 may have a circuit-switched connection with an MSC 62, which may, in turn, be connected to a BSC 64. PWE gateway 60 may also be connected to other elements in aggregation center 28 and/or in wireless service provider network 32.

In particular, wireless service provider network 30 may use PWE gateway 60 to support OSS functions. For example, aggregation center 28 may include a network management system (NMS) 66 that monitors one or more performance parameters such as packet loss, packet delay, bit error rates, and jitter. Various PWE devices, such as PWE module 44 and 56, may transmit such performance information to NMS 66 via PWE gateway 60. If the performance information indicates that adjustment or corrective action is required, NMS 66 may communicate with one or more of the PWE devices and/or with network operation center 34. Further details regarding the use of PWE devices for OSS functions may be found in "Monitoring and Control of an Ethernet Link Using Pseudo-Wire Interfaces," U.S. application Ser. No. 11/146,594, filed Jun. 7, 2005, which is incorporated herein by reference.

3. Exemplary BTS Chassis

Figure 5:
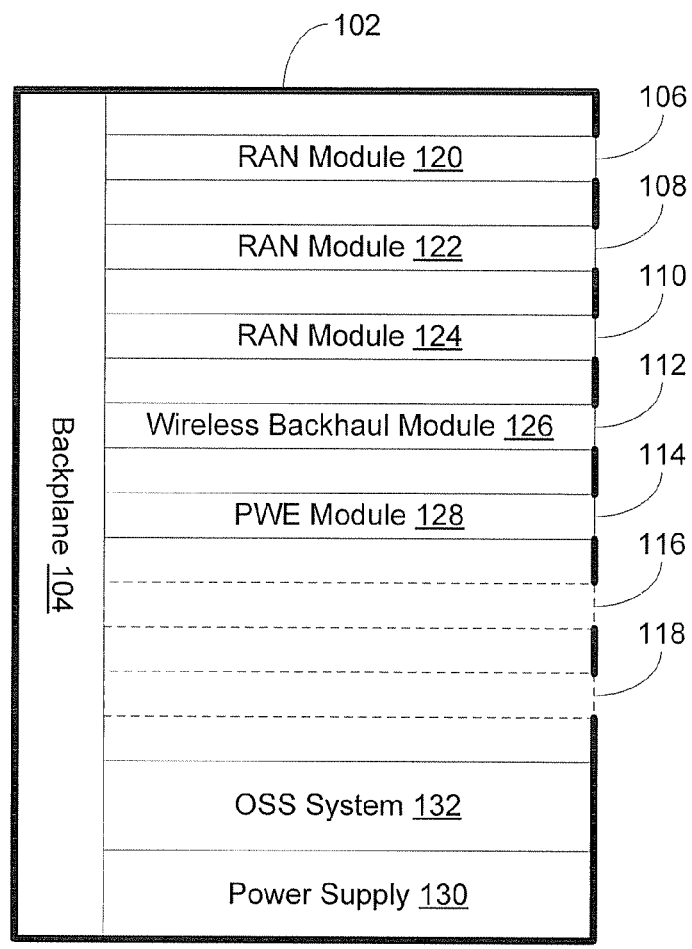
FIG. 5 is a side schematic view of a chassis for a configurable BTS, in accordance with an exemplary embodiment of the present invention.

In an exemplary embodiment, a configurable BTS or hub station, such as BTS 12 or hub station 24, includes one or more chassis that facilitate a modular design. An exemplary chassis 100 is illustrated (in a side schematic view) in FIG. 5. In the example of FIG. 5, chassis 100 is for a BTS that provides RAN coverage in three sectors. However, it is to be understood that a similar chassis may be used for other types of BTSs and for hub stations.

Chassis 100 may include a frame 102, which may be in the form of a cabinet or other enclosure. A backplane 104 may be mounted to the back of frame 102. Frame 102 may define a plurality of locations for removably receiving a plurality of modifies. For example, the front of frame 102 may include slots 106-118 through which modules may be inserted into chassis 100 and plugged into backplane 104. To remove a module from chassis 100, the module may be unplugged from backplane 104 and withdrawn through its corresponding slot. In this way, modules may be added (or replaced) in chassis 100 to conveniently configure (or re-configure) a BTS. The modules could be in the form of cards, blades, or in some other form that can be removable mounted in frame 102.

In the example of FIG. 5, chassis 100 houses RAN modules 120-124, which fill slots 106-110, respectively. RAN modules 120-124 are removably connected (e.g., plugged in) to backplane 104. Each of RAN modules 120-124 supports wireless communications in a respective one of the three sectors provided by the BTS.

Chassis 100 also houses a wireless backhaul module 126, which fills slot 112. Wireless backhaul module 126 is removably connected (e.g., plugged in) to backplane 104 and supports a particular type of wireless backhaul link. The particular type of wireless backhaul link may be selected from a menu of options that include different frequency bands, wireless distribution modes, and duplexing modes, for example, as summarized in Table 1. It is to be understood that Table 1 summarizes only an exemplary menu of options, as the wireless backhaul options may include different frequencies, distribution modes, or duplexing modes and/or different combinations than shown in Table 1.

TABLE 1

| Frequency Bands | Distribution Mode | Duplexing Mode |
|---|---|---|
| BRS (2.5 GHz) | PTP, PMP, mesh | TDD, FDD |
| LMDS (28, 39 GHz) | PMP | FDD |
| DEMS (24 GHz) | PMP | FDD |
| Common Carrier (2, 4, 6, 10, 11, 18, 24 GHz) | PTP | TDD, FDD |
| UNII (5 GHz) | PTP, PMP, mesh | TDD, FDD |
| E-Band (71-76, 81-86, 92-96 GHz) | PTP | FDD |

To configure a BTS for a particular wireless backhaul option from the menu, the appropriate type of wireless backhaul module 126 may be provided and plugged into backplane 104 through slot 112. To re-configure the BTS for a different wireless backhaul option from the menu, wireless backhaul module 126 may be removed (i.e., unplugged from backplane 104) and replaced with a different type of wireless backhaul module.

Chassis 100 may also house a pseudo-wire emulation (PWE) module 128 that plugs into backplane 104 through slot 114. PWE module 128 may function to emulate a circuit-switched backhaul connection for RAN modules 120-124.

Backplane 104 is configured to communicatively couple modules together and to provide a common ground for the modules. For example, backplane 104 may communicatively couple RAN modules 120-124 to PWE module 128 and may communicatively couple PWE module 128 to wireless backhaul module 126. Moreover, backplane 104 may be configured to accommodate any of a plurality of different types of wireless backhaul module, so as to provide a BTS with any combination of frequency, distribution mode, and duplexing mode within a preselected menu of wireless backhaul options (e.g., as set forth in Table 1).

Chassis 100 may also include one or more slots, such as slots 116 and 118, that are reserved for later use or for optional components. Thus, additional modules may be plugged into backplane 104 through slots 116 and 118. For example, if a mesh arrangement is used for wireless backhaul, an Ethernet switch may be added to chassis through either slot 116 or 118.

Chassis 100 may also house other components. For example chassis 100 may include a power supply 130 that provides electrical power for the modules mounted in chassis 100, e.g., through backplane 104. Chassis 100 may also house an OSS system 132. OSS system 132 may perform various functions to support the wireless service provider's operational support system. Such functions may include one or more of the "FCAPS" model functions, i.e., fault management, configuration management, accounting management, performance management, and security management. For example, OSS system 132 may monitor the performance of the components in chassis 100, such as RAN modules 120-124 and wireless backhaul module 126, and report events as described in more detail below.

Chassis 100 may also include one or more connectors for connecting feed lines to antenna elements. The antenna elements may include one or more RAN antennas (e.g., different antennas for different RAN sectors) and one or more backhaul antennas. Alternatively, the RAN and backhaul antennas could be integrated. The feed lines to the antennas could be, for example, coaxial cables and may carry either radio frequency (RF) or intermediate frequency (IF) signals. Coaxial connectors for the feed lines could be located on the modules in chassis 100. Thus, RAN modules 120-124 may include one or connectors for connecting one or more feed lines for one or more RAN antennas, and wireless backhaul module 126 may include one or more connectors for connecting one or more feed lines for one or more backhaul antennas.

Figure 6:
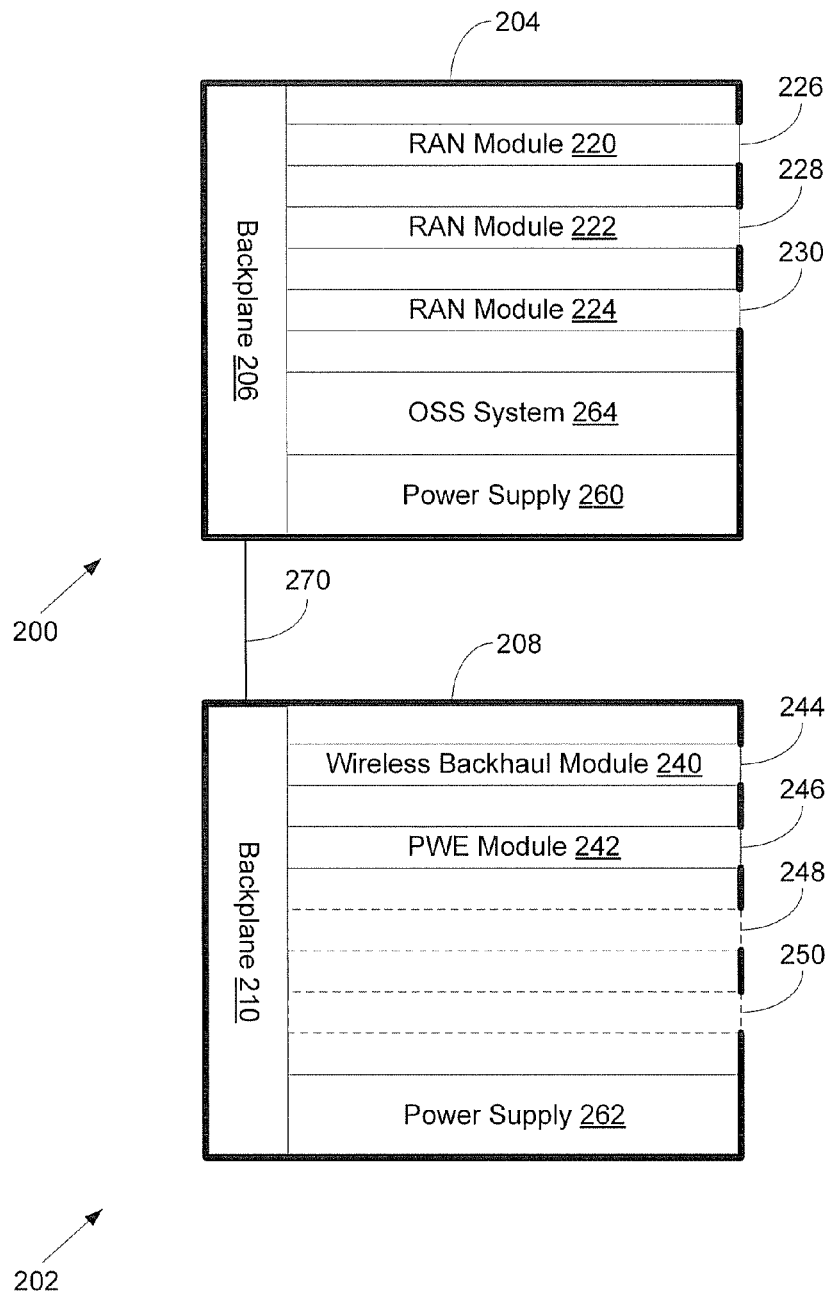
FIG. 6 is a side schematic view of tandem chassis for a configurable BTS, in accordance with an exemplary embodiment of the present invention.

Instead of having the RAN, wireless backhaul, and other modules housed together in a single chassis, the modules could be distributed among multiple chassis. For example, FIG. 6 illustrates a tandem chassis approach for a configurable BTS, in which modules are distributed between a first chassis 200 and a second chassis 202. First chassis 200 includes a first frame 204 and a first backplane 206, and second chassis 202 includes a second frame 208 and a second backplane 210. First chassis 200 houses RAN modules 220-224, which may be removably plugged into backplane 206 through slots 226-230, respectively. RAN modules 220-224 may include connectors for connecting one or more feed lines for one or more RAN antennas.

Second chassis 202 may house modules to provide wireless backhaul for the modules in first chassis 200. Thus, second chassis 202 may house a wireless backhaul module 240 and a PWE module 242, which may be removable plugged into backplane 210 through slots 244 and 246 respectively. Wireless backhaul module 240 may include one or more connectors for connecting one or more feed lines for one or more backhaul antennas. Second chassis 202 may also include one or more additional slots, e.g., slots 248 and 250, for mounting future or optional components, such as an Ethernet switch that may be included when a microwave mesh is used for backhaul.

Chassis 200 and 202 may also include respective power supplies. Thus, first chassis 200 may be powered by a first power supply 260 and second chassis may be powered by a second power supply 262. However, chassis 200 and 202 could be monitored by a single OSS system 264, which may be located in chassis 200, as shown in FIG. 6. Alternatively, chassis 200 and 202 may house respective OSS systems that are physically separate but function together as an integrated OSS system.

Chassis 200 and 202 may be communicatively coupled together by a connection 270. Connection 270 may convey backhaul communication and OSS communications between the two chassis. In this way, the RAN and backhaul functions may be divided between first chassis 200 and second chassis 202, respectively, while the two chassis function together in a configurable BTS or hub station.

By using one or more chassis, such as single chassis 100 or tandem chassis 200 and 202, that can accommodate different wireless backhaul modules, a BTS can be configured to use any type of wireless backhaul link from a preselected menu of wireless backhaul options. The BTS may subsequently be re-configured by replacing the wireless backhaul module in the chassis with a different wireless backhaul module. In this way, a chassis may serve as a "universal" design that be configured to use different wireless backhaul links as the wireless telecommunications network evolves.

4. Exemplary Network Management Architecture

Figure 7:
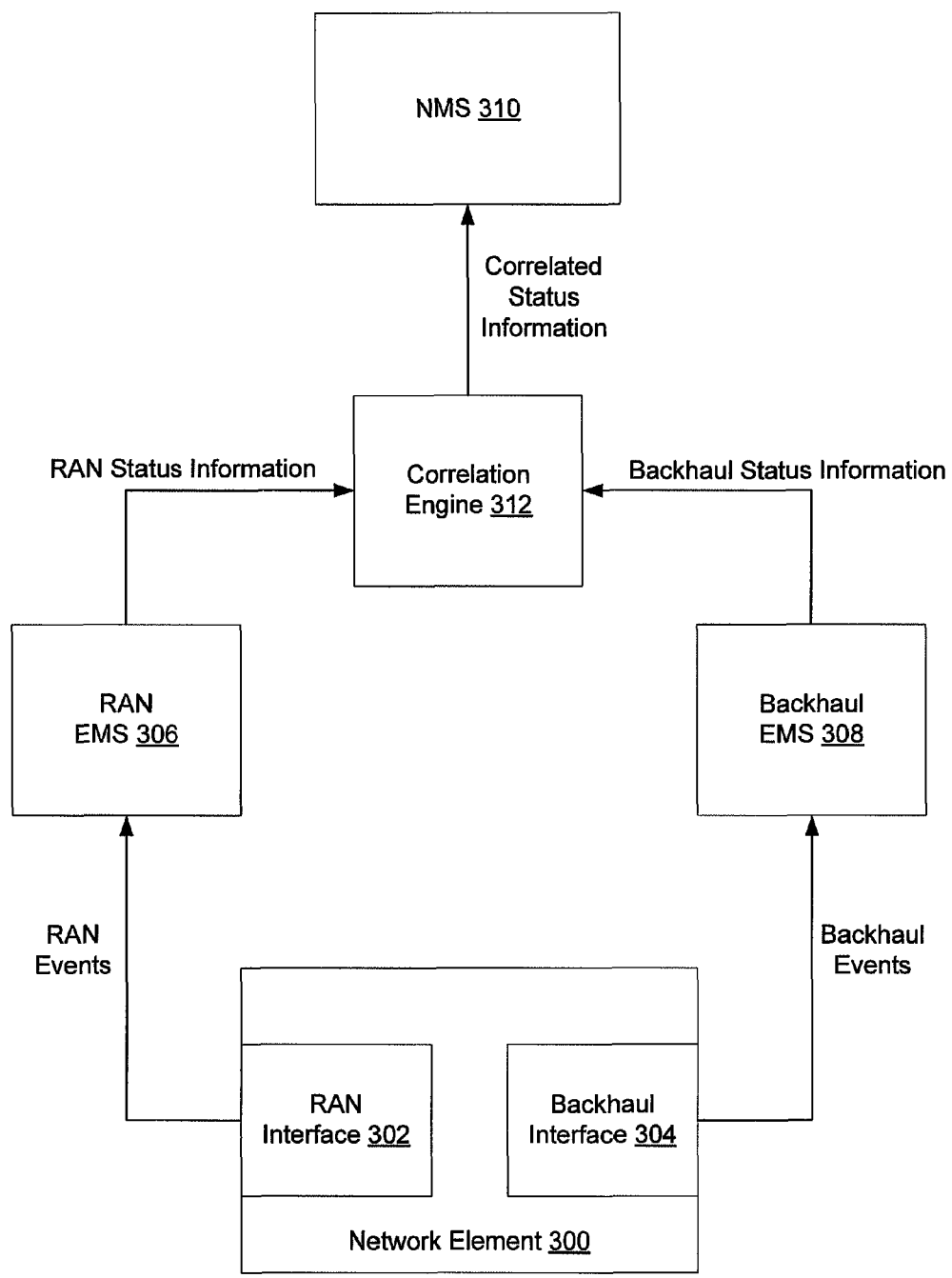
FIG. 7 is block diagram of a network management architecture, in accordance with an exemplary embodiment of the present invention.

FIG. 7 illustrates an exemplary network management architecture that may be used in a wireless telecommunications network, such as wireless telecommunications network 10 shown in FIG. 1. More particularly, FIG. 7 illustrates an architecture for managing a network element 300 that includes a RAN interface 302 and a backhaul interface 304. With reference to FIG. 1, network element 300 could be, for example, a BTS, such as BTS 12, or a hub station, such as hub station 24. RAN interface 302 may include one or more RAN modules for wireless communication with mobile stations. For example, RAN interface 302 may correspond to RAN modules 120-124 shown in FIG. 5 or to RAN modules 220-224 shown in FIG. 6. Backhaul interface 304 conveys backhaul communications for RAN interface 302 by communicating with a backhaul network, such as the two-tier backhaul network shown in FIG. 1. Thus, backhaul interface 304 may include a wireless backhaul module and a PWE module, e.g., corresponding to wireless backhaul module 126 and PWE module 128 shown in FIG. 5 or to wireless backhaul module 240 and PWE module 242 shown in FIG. 6.

A RAN EMS 306 may remotely manage RAN interface 302, and a backhaul EMS 308 may remotely manage backhaul interface 304. As part of the management process, RAN EMS 306 may receive notifications of RAN events from RAN interface 302, and backhaul EMS may receive notifications of backhaul events from backhaul interface 304. The event notifications may describe recent occurrences, such as performance measurements, fault indications, status updates, or other operational parameters. The event notifications may be generated automatically or in response to communications from RAN EMS 306 or backhaul EMS 308. Network element 300 may include one or more interfaces for communicating these event notifications, e.g., corresponding to OSS system 132 in FIG. 5 or to OSS system 264 in FIG. 6.

Although FIG. 7 shows RAN EMS 306 and backhaul EMS 308 managing only one network element, it is to be understood that these EMSs could remotely manage multiple network elements. For example, RAN EMS 306 may manage RAN interfaces in a plurality of BTSs, and backhaul EMS 308 may manage backhaul interfaces in the plurality of BTSs.

RAN EMS 306 may generate RAN status information based on the RAN event notifications, and backhaul EMS 308 may generate backhaul status information based on the backhaul even notifications. The RAN status information may include operational metrics that indicate the performance of RAN interface 302, and the backhaul status information may include operational metrics that indicate the performance of backhaul interface 304.

The status information may then be monitored in various ways. For example, RAN EMS 306 and backhaul EMS 308 may each include a respective user interface with which operations personnel may access the status information. In addition, RAN EMS 306 and backhaul EMS 308 may each include a respective log system that logs alarm conditions or other trigger conditions that may be indicated by the status information.

One or more higher-level systems, such as network management system (NMS) 310, may also receive status information, preferably in the form of correlated status information that indicates the performance of RAN interface 302 in combination with backhaul interface 304. NMS 310 could be located in an aggregation center and, thus, might correspond to NMS 66 shown in FIG. 4. Alternatively, NMS 310 could be at a different network location. The correlated status information may be generated by a correlation engine 312, based on the RAN status information generated by RAN EMS 306 and the backhaul status information generated by backhaul EMS 308. Correlation engine 312 may be part of either RAN EMS 306 or backhaul EMS 308, in which case that particular EMS may provide the correlated status information to NMS 310. Alternatively, correlation engine 312 may be separate from both RAN EMS 306 and backhaul EMS 308.

NMS 310 may be used to monitor the correlated status information and to take corrective action based on the correlated status information. In this regard, NMS 310 may be configured to initiate certain corrective actions automatically. Alternatively, or additionally, operations personnel may access NMS 310 through an operator interface. The operator interface may allow operations personnel to view the correlated status information and/or to initiate corrective actions based on the correlated status information.

Corrective actions may include adjustment of parameters that control the flow of RAN traffic and/or backhaul traffic. In particular, a failure or service degradation in one network (RAN or backhaul) may be addressed by throttling or load balancing in the other network. For example, if a problem with a wireless backhaul link is identified, the problem may be addressed by assigning RAN resources more conservatively. On the other hand, increasing (or decreasing) demands on the RAN may be addressed by increasing (or decreasing) capacity in the backhaul network.

NMS 310 may control RAN traffic and/or backhaul traffic in various ways. For example, to control RAN traffic, NMS 310 may communicate with one or more network elements that assign RAN resources, such as BSC 64. To control backhaul traffic, NMS 310 may communicate with NOC 34, e.g., to allocate bandwidth for backhaul traffic, de-allocate bandwidth for backhaul traffic, or to re-route backhaul traffic in packet-switched network 32.

The correlated status information could also be useful in disaster recovery. For example, if numerous wireless backhaul links fail, an ad hoc backhaul network could be dynamically constructed from the remaining links.

In this way, the monitoring of correlated status information can add value by linking the implications of events and indications from the RAN and backhaul interfaces of the BTSs. This information may, in turn, enhance understanding of the overall state of the wireless telecommunications network and may lead to more efficient operation and increased customer satisfaction.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A system for managing elements of a wireless telecommunications network, said system comprising:
    a base transceiver station (BTS), said BTS including
    (i) a radio access network (RAN) element for wireless communication with mobile stations, wherein said RAN element is configured to generate RAN event notifications, and
    (ii) a backhaul element for conveying backhaul communications for said RAN element, wherein said backhaul element is configured to generate backhaul event notifications;
    a RAN element management system for remotely managing said RAN element, wherein said RAN element management system generates RAN status information based on said RAN event notifications;
    a backhaul element management system for remotely managing said backhaul element, wherein said backhaul element management system generates backhaul status information based on said backhaul event notifications; and
    a correlation engine, separate from said RAN element management system and said backhaul element management system, for generating correlated status information based on said RAN status information and said backhaul status information, whereby said correlated status information indicates performance of said RAN element in combination with said backhaul element.

2. The system of claim 1, wherein said backhaul element is a wireless backhaul module in said BTS.

3. The system of claim 1, further comprising a network management system (NMS) that receives said correlated status information from said correlation engine.

4. The system of claim 3, wherein said NMS includes an operator interface that allows an operator to access said correlated status information.

5. The system of claim 4, wherein said operator interface allows said operator to take corrective action based on said correlated status information.

6. The system of claim 5, wherein said corrective action comprises allocating or de-allocating bandwidth for said backhaul communications.

7. A system for a wireless telecommunications network, said system comprising:

a base transceiver station (BTS), said BTS including a radio access network (RAN) interface for communicating with mobile stations and a backhaul interface for communicating with a backhaul network, said backhaul network comprising a packet-switched network;

a RAN element management system for remotely managing said RAN interface, wherein said RAN element management system is configured to generated RAN status information based on RAN event notifications generated by RAN interface;

a backhaul element management system for remotely managing said backhaul interface, wherein said backhaul element management system is configured to generate backhaul status information based on backhaul event notifications generated by said backhaul interface;

a correlation engine for generating said correlated status information based on said RAN status information and said backhaul status information, said correlated status information indicating performance of said RAN interface in combination with said backhaul interface; and a network management system (NMS) configured to monitor correlated status information and to initiate corrective action based on said correlated status information, said corrective action comprising allocating or de-allocating bandwidth for backhaul traffic in said packet-switched network.

8. The system of claim 7, wherein said backhaul network includes a wireless communication link between said BTS and a hub station.

9. The system of claim 8, wherein said packet-switched network is between said hub station and an aggregation center of a wireless service provider network.

10. The system of claim 7, wherein said NMS is communicatively coupled to said BTS via at least one of said element management systems.

11. The system of claim 7, wherein said corrective action comprises controlling assignment of RAN resources.

12. The system of claim 7, wherein said corrective action comprises re-routing backhaul traffic in said packet-switched network.

13. A method for monitoring a base transceiver station (BTS) of a wireless telecommunications network, said BTS including a radio access network (RAN) interface for communicating with mobile stations and a backhaul interface for communicating with a backhaul network, said method comprising:

receiving RAN event notifications from said RAN interface;

receiving backhaul event notifications from said backhaul interface;

generating RAN status information based on said RAN event notifications;

generating backhaul status information based on said backhaul event notifications;

a correlation engine generating correlated status information of said BTS based on said RAN status information and said backhaul status information, whereby said correlated status information indicates performance of said RAN interface in combination with said backhaul interface;

said correlation engine providing said correlated status information to a network management system; and monitoring said correlated status information at said network management system.

14. The method of claim 13, further comprising:
controlling traffic through said RAN interface based on said correlated status information.

15. The method of claim 14, wherein controlling traffic through said RAN interface comprises:
increasing traffic through said RAN interface.

16. The method of claim 14, wherein controlling traffic through said RAN interface comprises:
decreasing traffic through said RAN interface.

17. The method of claim 13, further comprising:
controlling traffic through said backhaul interface based on said correlated status information.

18. The method of claim 17, wherein controlling traffic through said backhaul interface comprises:
increasing traffic through said backhaul interface.

19. The method of claim 17, wherein controlling traffic through said backhaul interface comprises:
decreasing traffic through said backhaul interface.

* * * * *